United States Patent [19]
Wolter et al.

[11] 3,911,139
[45] Oct. 7, 1975

[54] PROCESS FOR CONTINUOUS ACCELERATED FERMENTATION AND RIPENING OF BEER

[76] Inventors: Hans-Carl Wolter, Clara-Zetkin Strasse 52, 1634 Rangsdorf; Martin Kruger, Schonhauser Allee 84, 1071 Berlin; Peter Liebs, Bersarinstrasse 15, 1034 Berlin; Jorg Mowius, Thurnagelstrasse 4, 117 Berlin-Kopenick; Karl-Heinz Wolf, Leninallee 144, 1017 Berlin, all of Germany

[22] Filed: Sept. 24, 1973

[21] Appl. No.: 399,948

[52] U.S. Cl. ................................ 426/16; 426/11
[51] Int. Cl. ............................................ C12c 11/14
[58] Field of Search ............................ 426/16, 11

[56] References Cited
UNITED STATES PATENTS

| | | | |
|---|---|---|---|
| 766,271 | 8/1904 | Lapp | 426/16 |
| 2,789,907 | 4/1957 | Haselbach | 426/16 |
| 3,563,759 | 2/1971 | Wolter et al. | 426/16 |

*Primary Examiner*—Raymond N. Jones
*Attorney, Agent, or Firm*—V. Alexander Scher

[57] ABSTRACT

A process for accelerated continuous fermentation and ripening of bottom-fermenting beer of the quality of lager beer brands with an original wort content between 10.0 and 13.0% is characterized in that the propagation of yeast in work takes place with an extract content between 10.0 and 13.0%, a temperature of between 16° and 25°C, a pressure of between 0.4 and 0.7 kp/cm$^2$ and a dilution rate of between 0.04 and 0.065 h$^{-1}$ and simultaneously fermenting and ripening in the high column of liquid at a temperature between 16° and 25°C remaining the same from top to bottom and a CO$_2$ pressure upon the surface of the liquid at the top of the column between 1.5 and 3.5 kp/cm$^2$.

1 Claim, No Drawings

PROCESS FOR CONTINUOUS ACCELERATED FERMENTATION AND RIPENING OF BEER

This invention relates to an accelerated continuous process for fermenting and ripening of bottom-fermenting beer having the quality of lager beer brands with an original wort content between 10.0 and 13.0%.

In prior patents a continuous process is described wherein the propagation of yeast in wort takes place with an extract content of 11 to 12% at 8° to 9°C and an attenuation speed of 0.014 to 0.024 $h^{-1}$, whereupon the wort located in the fermentation flows as such or mixed with a second partial flow of non-fermented wort for simultaneous fermenting and ripening as a high column of liquid with temperature dropping from top to bottom. According to U.S. Pat. No. 3,563,759 an increase in temperature is thereupon provided in the lower part of the column of liquid.

This process involves comparatively high installation costs and numerous experiments have been caried out in order to increase the economic effectiveness of the process by increasing the output rate of a specific installation.

It is known that by using fermentation temperatures above 12°C an acceleration of fermentation can be attained; however then bottom-fermenting lager beers are produced having a winy and unpleasant bitter taste, as well as a bad foam holding capacity.

An object of the present invention is to improve the economic parameter of prior art processes, particularly for bottom-fermenting beers of the quality of lager beer types with an original wort content between 10.0 and 13.0%. A specific object of the present invention is to keep the quality features of prior art process while increasing the output by changing biological and biochemical procedures.

Contrary to the convictions of those skilled in the art it was found that the process of the present invention makes possible to carry out an accelerated fermenting and ripening at temperatures up to 25°C without making worse the quality of the beer. In accordance with the present invention the process described in the above patent is changed in following respects:

The propagation of yeast in wort with an extract content between 10.0 and 13.0% takes place between 16° and 25°C, a pressure upon the surface of the fermenting wort between 0.4 and 0.7 $kp/cm^2$ and a dilution rate between 0.04 and 0.065 $h^{-1}$. The simultaneous fermenting and ripening in a vertical high column of liquid flowing from top to bottom takes place at 16° to 25°C, whereby the temperature is the same at all parts of the column of liquid, and the $CO_2$ pressure is between 1.5 and 3.5 $kp/cm^2$ upon the surface of the liquid at the top of the column.

The finishing of the beer takes place according to the known process: the beer immediately after leaving the column in a continuous flow is cooled shock-like from the temperature prevailing in the column of liquid (between 16° and 25°C) to 1°C and then cleared.

Beer flows into a supply tank having a counter pressure between 1.0 and 1.4 $kp/cm^2$. The beer can be immediately filtered and filled.

The solution of oxygen required for the preparation of yeast in the wort can also take place by other known methods.

The process of the present invention increases the output at least by 2.7 to 3.5 times as compared to the above-mentioned patent. The bottom-fermenting beer has a clean taste of the type pertaining to lager beers as well as a pleasant bitter taste. Impressions of taste and foam continuity are good.

The following example for a light full beer is given by way of exemplification only:

EXAMPLE

Finished wort with an extract content of 11.4% from which the hot sediment was removed, was cooled to 2°C and the fine sediment separated by the cooling was removed by kieselguhr settling filtration. Wort is heated to about 20°C, aired and then flows into the propagation fermentor. It stays for 16.7 hours (dilution rate equals 0.06 $h^{-1}$), pressure in the unfilled space of the fermentor is 0.5 $kp/cm^2$, the Reynolds number in the medium is greater than $10^4$. The yeast concentration in the propagation amounts to $90 \times 10^6$ cells/ml, the apparent extract content is 6.3%. Then the fermenting wort flows into the head of a fermenting and ripening column which is 12 m high and in which it flows as a liquid column vertically from top to bottom. The Reynolds number in the 12 sections of the liquid column is greater than $10^4$. The 12 sections are interconnected by open slits according to the formula:

$$\frac{\text{surface of slit opening}}{\text{cross section of column}} = 0.97 \times 10^{-2};$$

This makes possible the flow of the fermenting liquid as well as the upwardly flowing $CO_2$ current. The back mixing factor amounts to 0.18.

$CO_2$ pressure of 2.0 $kp/cm^2$ is exerted upon the liquid column which is 12 m high. The temperature in the liquid column amounts to 20° C, the average stay period in the liquid column is 40 hours. Immediately after leaving the column the beer is shocklike cooled in a continuous flow from 20° C to 1° C and is then clarified. It flows into a supply tank in which there is a counterpressure of 1.1 $kp/cm^2$. The beer can be immediately filtered and filled. It has a pleasant bitter taste, as well as a clean specific taste and smell. The $CO_2$ content is 0.2%. Impressions of taste and foam continuity are good.

The total treating period of this process amounts to only 57 hours as compared to 152 hours of the process described in the above patent. Thus the output of the process of the present invention is increased by 2.7 times as compared to prior art.

What is claimed is:

1. A process for the accelerated continuous fermentation and ripening of bottom-fermenting beer having the quality of lager beer brands and an original wort content of between 10.0% and 13.0%, said process comprising propagating yeast in wort with an extract content of between 10.0% and 13.0% while heating it by fermentation to a temperature of between 16°C and 25°C, subjecting it to pressure upon the surface of the wort of between 0.4 $kp/cm^2$ and 0.7 $kp/cm^2$ and a dilution rate of between 0.04 $h^{-1}$ and 0.065 $h^{-1}$, and simultaneously fermenting and ripening it in a high liquid column flowing from top to bottom and having a uniform temperature of between 16°C and 25°C and a $CO_2$ pressure upon the top of the column of between 1.5 $kp/cm^2$ and 3.5 $kp/cm^2$.

* * * * *